United States Patent [19]

Travis

[11] 3,874,914

[45] Apr. 1, 1975

[54] ADHESIVE COATINGS OF VINYL POLYMERS AND COPOLYMERS AND METHOD OF MAKING SAME

[75] Inventor: David Travis, Lumberton, N.J.

[73] Assignee: Sybron Corporation, Rochester, N.Y.

[22] Filed: Aug. 18, 1972

[21] Appl. No.: 281,789

[52] U.S. Cl................... 117/161 UH, 117/161 R, 117/161 UC, 117/161 UE, 117/161 UB, 117/161 UF, 156/334, 260/30.4 R, 260/32.8 R, 260/33.6 UA

[51] Int. Cl.............................................. B44d 1/02

[58] Field of Search.... 117/161 R, 161 UH;161 UC, 117/161 UE, 161 UB, 161 UF; 156/33, 333, 334; 260/30.4 R, 32.8 R, 33.6 UA, 239 E

[56] References Cited
UNITED STATES PATENTS

| | | | |
|---|---|---|---|
| 3,136,681 | 6/1964 | Johnston | 156/333 |
| 3,182,040 | 5/1965 | Watkins | 156/331 |
| 3,197,463 | 7/1965 | Tesoro | 117/135.5 X |
| 3,198,770 | 8/1965 | Watkins | 260/77.5 B |
| 3,223,681 | 12/1965 | Rambosek | 156/331 X |
| 3,280,106 | 10/1966 | Ham | 156/331 X |
| 3,281,498 | 10/1966 | Watkins | 260/873 |
| 3,285,798 | 11/1966 | Tesoro | 117/76 T |
| 3,507,814 | 4/1970 | Uelzmann | 156/331 X |
| 3,514,369 | 5/1970 | Uelzmann et al. | 156/331 X |
| 3,711,463 | 1/1973 | Uelzmann | 156/331 X |

*Primary Examiner*—Cameron K. Weiffenbach
*Attorney, Agent, or Firm*—Theodore B. Roessel; Ernest F. Chapman; James A. Rich

[57] ABSTRACT

The adhesive properties of vinyl resins are substantially improved by adding thereto or mixing therewith polyfunctional aziridines dissolved in inert organic liquid media. The polyfunctional aziridines may be added to vinyl resins which are in solution, to vinyl resins which are in the form of organosols or plastisols, or to vinyl resins which are in the form of solids (powders). The process of this invention has found particular utility in the coating of vinyl resins upon nonporous surfaces.

8 Claims, No Drawings

ADHESIVE COATINGS OF VINYL POLYMERS AND COPOLYMERS AND METHOD OF MAKING SAME

BACKGROUND OF THE INVENTION

This invention relates to coated articles and coating processes, and more particularly, to a process for improving the adhesion of vinyl resin materials to substrates by the addition of chemical agents to the vinyl resins and the vinyl resin materials prepared thereby.

The vinyl resins are polymers prepared by polymerization of copolymerization of vinyl monomers including vinyl chloride, vinyl acetate, vinylidene chloride, methyl acrylate, methyl methacrylate and numerous other monomers characterized by the presence of a carbon double bond in the monomer molecule, Which opens during polymerization to make possible the carbon chain of the polymer.

Among those applications of vinyl resins which depend upon the ability of the resin to adhere to a substrate are those in which a coating or layer of the vinyl resin and particularly a protective coating is applied to the substrate. When these vinyl resins are applied to the substrate, it is generally the practice to first apply a prime coat to the substrate or to incorporate in the vinyl resin a specialized vinyl monomer containing groups, such as, carboxyl or hydroxyl, to promote adhesion of the vinyl resin to the substrate. These methods are uneconomical in that they either require the application of multiple coatings, or they require the incorporation of large amounts of the expensive specialized vinyl copolymers or both.

In another prior art method disclosed in U.S. Pat. No. 3,285,798 adhesive coating agents are provided for anchoring or bonding vinyl resins to textile fabrics. In U.S. Pat. No. 3,285,798 an adhesive comprising an aqueous dispersion of a vinyl resin and an aziridine compound having at least two aziridinyl groups is applied to a textile material and cured prior to laminating the textile material with a vinyl resin. This patented method provides an adhesive composition suitable for laminating a textile to a vinyl resin substrate, and the adhesive composition is merely an anchoring coating layer applied to hold the elements or layers of the laminated article together. Furthermore, the adhesive composition of U.S. Pat. No. 3,285,798 is applied in the form of an aqueous emulsion. This provides conditions wherein the aziridine can react with the water and thereby consume aziridinyl reactive groups, a factor which not only effects adhesive properties, but which also has an adverse effect upon stability of the aziridine material. The adhesion of a coating material prepared by applying a vinyl resin to which has been added an aqueous dispersion of an aziridine having at least two aziridinyl groups per molecule, is at most poor.

OBJECTS OF THE INVENTION

Accordingly, it is an object of this invention to provide a process which eliminates the practice of using an anchoring coating layer, a prime coat layer and/or incorporating into the vinyl resin a specialized vinyl monomer containing adhesion-promoting functional groups, to promote the adhesion of a vinyl resin layer to a substrate.

It is another object of this invention to provide a new and novel vinyl resin coating composition wherein the vinyl resin coating itself has excellent adhesive properties when applied to both porous and non-porous substrates.

Still another object of this invention is to provide a process for promoting the adhesion of vinyl resins to a substrate by using agents in a liquid medium which is non-reactive (inert) with said agents.

Another object of this invention is to provide a process wherein polyfunctional aziridine compounds are incorporated in the vinyl resin protective layer to promote adhesion of the protective layer itself to a substrate.

These and other objects and advantages of the invention will become apparent to those skilled in the art.

SUMMARY OF THE INVENTION

In accordance with the foregoing objects I have found that the application of a polyfunctional aziridine partially or completely dissolved in an inert, liquid organic medium to a vinyl resin greatly improves the adhesion of the vinyl resin to non-porous as well as porous substrates, and I have thereby eliminated the necessity for an application of an intermediate layer to promote the adhesion of the vinyl resin to the substrate or for the incorporation of specialized vinyl monomers containing functional groups which promote adhesion, e.g., maleic acid-modified vinyl copolymer resins.

The process of my invention comprises adding to a vinyl resin, prior to coating the resin upon a substrate, a polyfunctional aziridine at least partially dissolved in an inert organic liquid medium. When the vinyl resin is prepared according to the process of my invention, and applied as a coating upon a substrate, I have found unexpectedly that the vinyl resin coat has excellent adhesive properties far superior to vinyl resin coatings applied in the form of aqueous dispersions. By using the process of my invention vinyl resin coatings have even been found to adhere to such non-porous substrates as glass and buffed steel plates. In the present invention, it is critical that the process be carried out in non-aqueous media to provide excellent adhesion of the vinyl resin coat.

DESCRIPTION OF THE PREFERRED EMBODIMENTS

In a preferred embodiment the vinyl resins having excellent adhesive properties are prepared by adding a polyfunctional aziridinyl compound previously dissolved or prepared in a suitable non-reactive, liquid, organic solvent, to a vinyl polymer or vinyl copolymer solution. Although there are no upper limits upon the amount of polyfunctional aziridine compound which can be added to the vinyl resin, it is preferred that an amount of at least 0.5 weight percent (based upon the weight of the vinyl resin) up to about ten weight percent (based upon the weight of the vinyl resin) be added to the vinyl resin.

In other embodiments, the polyfunctional aziridinyl compound previously dissolved or prepared in a suitable, non-reactive, liquid, organic solvent, may be mixed with the vinyl polymer or vinyl copolymer in the form of a batter, such as, an organosol or a plastisol, or it may be mixed with a powdered vinyl polymer or vinyl copolymer. When the polyfunctional aziridine in the inert, organic, liquid medium is mixed with the powdered vinyl resin, the resin retains its powdery consistency and is essentially unchanged in flow properties. The powdered resin absorbs the dissolved aziridine and retains its powdery form. This particular form of the vinyl resin has particular utility in the application of the vinyl resin powders to substrates by electrostatic systems.

The vinyl resin materials which may be used in the present invention are those which are in non-aqueous media or in a powdered or dry form. The vinyl resins may be prepared from vinyl monomers by techniques known to those skilled in the art and are commercially available. Because of the limitations applied to the process of the present invention, namely, the exclusion of aqueous media, vinyl resin latexes which are in an aqueous medium are necessarily excluded from the vinyl resins which may be utilized in the process of the present invention unless the aqueous medium is removed therefrom. The term vinyl resin has been defined above, however, examples of vinyl resins which may be used in accordance with the present invention are polyvinyl chloride, polyvinyl acetate, copolymers of vinyl chloride and vinyl acetate, polyvinylidene chloride, polymers and copolymers of the alkyl acrylates and the alkyl methacrylates, such as ethylacrylate and methyl methacrylate, copolymers of vinyl chloride and acrylonitrile, and the like. The vinyl resin materials may also optionally contain plasticizer components and/or stabilizing agents. One skilled in the art can select a vinyl resin of suitable molecular weight for coating a particular substrate.

As the plasticizer component of the vinyl resin material of this invention any of the known vinyl-type plasticizers can be employed, although phthalates, such as dioctyl phthalate, and similar plasticizers are preferred. The stabilizer component is added to the composition to prevent decomposition upon heating, drying, exposure to light, and the like. It is customary to use a stabilizer when a coating or film is formed from the vinyl resin. A general purpose vinyl resin stabilizer, such as a liquid mercaptide, may be used. Examples of commercially available vinyl stabilizers are those prepared by Argus Chemical Corp. and designated as Argus Mark 292, Argus Mark LL, and the like. Suitable vinyl resin stabilizers and vinyl resin plasticizers and concentrations thereof may be selected by one skilled in the art. Amounts and types of stabilizer and plasticizer may vary according to the particular utility of the vinyl resin material.

The aziridinyl compounds which may be used in the present invention, are those aziridine compounds having at least two aziridinyl groups per molecule and are referred to herein as the polyfunctional aziridines. Examples of polyfunctional aziridines are set forth in U.S. Pat. Nos. 3,165,375; 3,197,463; and 3,355,437 which are incorporated herein by reference. Specific examples of preferred polyfunctional aziridine compounds which may be used in the present invention, are trimethylol propane tris (2-aziridinyl propionate); trimethylol propane tris (2-aziridinyl butyrate); tris-(1-aziridinyl)-phosphine oxide; tris-(1-aziridinyl)-phosphine sulfide; tris-(2-methyl-1-aziridinyl)-phosphine oxide; pentaerythritol tris 3-(1-aziridinyl propionate); pentaerythritol tetra 3-(1-aziridinyl propionate), and the like.

Although the vinyl resin does not have to be present in a liquid medium, for example, when the vinyl resin is utilized in a powdered form, in many cases the vinyl resin is applied in a liquid medium. When the vinyl resin is in the form of a plastisol, there is a liquid dispersion of finely divided resin in a plasticizer, for example, dioctyl phthalate. The plastisol is usually 100 percent solid with no volatiles, and when volatile content exceeds about 5 percent of the total weight it is called an organosol. An organosol is a colloidal dispersion of any insoluble vinyl resin material in an organic liquid, and more specifically the finely divided or colloidal dispersion of a vinyl resin in plasticizer in which dispersion the volatile content exceeds about 5% of the total weight. Thus, organosols can also be used in the present invention. It is also within the scope of the present invention to use vinyl resin either partially or completely dissolved in an organic liquid solvent. The solvent must be inert, that is, non-reactive with the polyfunctional aziridinyl compounds which are added thereto in accordance with the present invention. Typical plastisols are 100 parts (by weight) QYNV, a polyvinyl chloride homopolymer sold by Union Carbide, in 50 parts (by weight) of dioctyl phthalate and Plastisol Resin SCC-20, a polyvinyl chloride homopolymer manufactured by Stauffer Chemical, Co. in 50 parts (per hundred parts of resin by weight) of dioctyl phthalate. Typical organosols are the polyvinyl chloride homopolymer materials and include those organosol produced by Mannington Mills and designated as J-469 Organosol. In order to practice the present invention, it is important to note that the vinyl resin cannot be suspended or contained in an aqueous medium, since the water in the aqueous medium will react with the functional groups of the polyfunctional aziridine and thereby destroy or substantially diminish the ability of the polyfunctional aziridine compound to promote the adhesion of the vinyl resin to the substrates. Examples of solvents which may be used to dissolve the vinyl resin or combinations of vinyl resins are dioxane, benzene, toluene, xylene, ketones, such as, methyl ethyl ketone, and methyl isobutyl ketone and tetrahydrofuran, and the like.

The polyfunctional aziridine must be at least partially soluble in an inert, liquid organic solvent. The polyfunctional aziridine compound can also be and is preferably completely soluble in the inert liquid organic medium and by use of the term "at least partially soluble" herein is meant that the polyfunctional aziridine compound may be completely soluble or may demonstrate a partial solubility in the particular organic solvent. Partially soluble herein designates that a suitable amount of polyfunctional aziridine dissolves in the organic liquid medium so that enough polyfunctional aziridine to promote adhesion will spread uniformly throughout the mass of the vinyl resin material. As in the case of solvents used in the vinyl resins, the organic liquid medium used for the polyfunctional aziridine compounds must also be inert or non-reactive with the functional groups of the aziridine material. This will promote the stability of the polyfunctional aziridines in the organic liquid medium and will also insure sufficient functionality of the aziridinyl groups to promote adhesion of the vinyl resins to substrates. Typical examples of liquid organic inert media for at least partially dissolving the polyfunctional aziridine compounds are dioxane, benzene, toluene, xylene, methyl ethyl ketone, methyl isobutyl ketone, tetrahydrofuran, and the like, and many of the common vinyl plasticizers such as, dioctyl phthalate.

The amount of polyfunctional aziridine which must be added to the vinyl resin in order to promote adhesion of the vinyl resin to the surface of a substrate, must be at least about 0.5 weight percent (based upon the weight of the vinyl resin). Although there is no upper limit in the amount of polyfunctional aziridine which can be added to the vinyl resin to effect the promotion of adhesion of the vinyl resin to the surface of a substrate, for economic reasons no more than about 10 weight percent (based upon the weight of the vinyl resin) should be mixed with the vinyl resins. The preferred amount of polyfunctional aziridine is from about 0.5 to about 5 weight percent based upon the weight of the vinyl resin. One skilled in the art can determine the optimum amount of polyfunctional aziridine which must be added to the vinyl resin to promote adhesion of the resin to the surface of the substrate by merely mixing various ratios of the polyfunctional arizidine with the vinyl resin and applying test strips of the vinyl resin to the surface of the substrate to determine the adhesive strength of the coated vinyl resin.

The substrates to which the vinyl resin treated with polyfunctional aziridines can be applied, may be any substrate which is normally protected or covered by a layer of the vinyl resins of the present invention. For example, the substrate may be a metallic surface or a non-metallic surface and may be porous or non-porous. The adhesive properties of the vinyl resins have been improved in accordance with the present invention to the extent that they may easily and economically be applied to and adhere to such non-porous surfaces as glass, buffed or polished metal plates, ceramics, and the like.

In many of the applications of the vinyl resins to substrates, the materials are heated after the vinyl resins are applied to the substrate, or the substrate may be heated prior to the application of the vinyl resin thereto. The heat may be applied merely for the purposes of drying the applied vinyl resin, that is, for the removal of solvents, or the application of the heat may effect curing of the vinyl resin and may reach temperatures as high as 200°C. or higher, the temperature being limited by the decomposition of the resin. The drying and/or curing are within the purview of one skilled in the art for the particular utility involved. For example, when the powdered vinyl resins are applied to a metal surface by an electrostatic system, the metal surface may be heated to a relatively high temperature to effect the curing of the vinyl resin. The drying may be effected at ambient temperatures or may be effected at elevated temperatures of about 40°–45°C or higher. The organosol and plastisol are also generally heated to effect curing of the vinyl resins after the vinyl resins are applied to the substrates. However, the present invention is not deemed heat-dependent, and as demonstrated in the examples, the vinyl resins of the present invention have excellent adhesion to substrates in the absence of application of heat thereto.

The polyfunctional aziridine in the inert liquid organic medium is physically added to or mixed with the vinyl resin. Although I do not want to be limited to any particular theory, it appears that the polyfunctional aziridine becomes a part of the vinyl polymer structure which in turn forms some type of linkage with the substrates. Regardless, of how the polyfunctional aziridines promote the adhesion of the vinyl resins to substrates, I have clearly demonstrated that the addition of the polyfunctional aziridines in the inert, liquid organic media to the vinyl resins substantially increases the adhesion of the vinyl resins to the substrates.

In general, a single solvent, a single polyfunctional aziridine and one particular type of vinyl resin are used in the process of the present invention, however, various combinations of these materials may also be utilized in accordance with the present invention. For example, a mixture of vinyl resins, a mixture or combination of solvents or a mixture or combination of polyfunctional aziridines may be effectively used in the practice of the present invention. Furthermore, in those cases where the vinyl resin is dissolved in a solvent or inert, liquid organic medium, the inert liquid organic medium for the polyfunctional aziridine may be a different inert, liquid organic medium than that used for the vinyl resin. Furthermore, the inert liquid organic medium of the polyfunctional arizidine compound may be the same or a different plasticizer than the plasticizer used in the vinyl resin.

It is within the scope of the present invention to utilize additives which do not effect the stability or the adhesive promoting activity of the polyfunctional aziridines with the vinyl resins. For example, as disclosed above, vinyl resin stabilizers may be added to the vinyl resins or to the polyfunctional aziridine in the inert, liquid organic medium to prevent decomposition (due to heat, dryness, light and the like) of the protective coating or film formed from the vinyl resin, fillers, pigments and other decorative agents to obtain desired aesthetic properties.

In order to disclose more clearly the nature of the present invention, specific examples illustrating the preparation of the adhesive coatings of vinyl polymers and vinyl copolymers and the process of adding and mixing the polyfunctional aziridine compounds to promote the adhesion of the vinyl resins will hereafter be described.

In certain of the examples set forth below reference is made to adhesive strength of the vinyl resin in terms of grams per ½ inch strip. These measurements are made by attaching a spring balance to the vinyl resin and exerting a force upon the balance in such a direction to peel the resin back over the surface of the adhering resin at an angle of 180°. The results are reported as the force (in grams) required to peel away a ½ inch strip from the substrate at an angle of 180°.

EXAMPLE 1

Ten grams (10g.) of polyvinyl chloride was dissolved in 90g. of tetrahydrofuran. The solution was divided into several aliguot parts and one part was set aside as a blank or control sample. To the other parts were added, while stirring, 1.0 ml. of a polyfunctional aziridine compound in dioxane as follows: trimethylol propane tris (2-aziridinyl propionate); trimethylol propane tris (2-aziridinyl butyrate); tris-(1-aziridinyl) phosphine oxide; tris (2-methyl-1-aziridinyl) phosphine oxide; and pentaerythritol tris-3-(1-aziridinyl) propionate. These solutions were poured into aluminum weighing dishes, dried under gentle infra-red heat, then heated for 1 hour at 105°C. to complete the removal of solvent.

The film obtained in this matter from the control sample was easily lifted from the aluminum dish whereas those films containing the aziridine compounds were all very difficult to remove because of a strong adhesion of the polyvinyl chloride to the aluminum surface.

EXAMPLE 2

An experiment similar to that in Example 1 was conducted with a solution of trimethylol propane tris-(2-aziridinyl propionate) in dioxane except 0.35 ml of the polyfunctional aziridinyl compound was used resulting in about 4% active polyfunctional aziridine in the vinyl polymer. Again, the marked improvement in adhesion was noted.

When the force required to peel a ½ inch strip of these films from the aluminum substrate at a 180° angle was measured it was found that the control sample could not be bent back at an angle of 180° without lifting the film from the substrate. The film containing 4 percent of the polyfunctional aziridine required a force of 489 grams to peel away a ½ inch strip at an angle of 180°.

EXAMPLE 3

Polyvinyl chloride (100g.) was dissolved in 562 grams of tetrahydrofuran containing 1.0 gram of a vinyl resin stabilizer and 35g. of dioctyl phthalate. Aliquot portions of this solution were taken and trimethyl propane tris (2-aziridinyl propionate) dissolved in dioxane was added to provide 0, 5, and 10 percent of the polyfunctional aziridine in the vinyl polymer solution. The solutions were allowed to stand overnight to remove entrapped air and then cast with a drawdown bar on finely sanded steel plates and on clean glass panels.

Substantial improvement in adhesion to both surfaces was obtained, as shown in Table 1, by the measured adhesion of ½ inch wide strips as determined by 180° peelback.

TABLE I

Vinyl Resin Adhesion to Steel and Glass Surfaces

| AMOUNT OF AZIRIDINE | FORCE REQUIRED TO PEEL RESINS FROM SURFACE (in grams) | |
|---|---|---|
| | STEEL | GLASS |
| 0% | Nil | Nil |
| 5% | 1000g | 400g |
| 10% | 1300g | 300–350g |

EXAMPLE 4

Vinyl chloride-vinyl acetate copolymer (14 grams) was dissolved in a mixture of 70 grams methyl ethyl ketone and 5 grams methyl isobutyl ketone. One part per hundred parts of resin [PHR] of stabilizer and 30 parts per hundred parts resin of dioctyl phthalate plasticizer were added. The resulting solution was divided into a control sample and a sample to which 4 parts per hundred parts of resin of trimethylol propane tris (2-aziridinyl propionate) was added.

In a similar manner for comparative purposes a solution was prepared in which 14g. of the above vinyl chloride-vinyl acetate copolymer and 4g. of a maleic acid modified vinyl chloride-vinyl acetate copolymer were dissolved in 70g. of methyl ethyl ketone and 5g. of methyl isobutyl ketone. One PHR of stabilizer and 30 PHR (parts per hundred parts of resin) of plasticizer were added as above. (Acid modified vinyl copolymers are generally used in the art to obtain good adhesion to various substrates).

The solutions were allowed to stand overnight to remove entrapped air and then cast with a drawdown bar on finely sanded steel plates on clean glass sheets.

Substantial improvement in adhesion to both surfaces was obtained as shown in Table 2 which shows the measured 180° pullback adhesion of ½ inch wide strips. The adhesion obtained by the use of the aziridine compound in the vinyl resin is superior to that obtained by the use of the maleic acic modified vinyl chloride-vinyl acetate copolymer.

TABLE 2

| Resin Composition | VINYL RESIN ADHESION Amount of Aziridine Compound on the Polymer | Force to Peel Resin (grams) | |
|---|---|---|---|
| | | To Steel | To Glass |
| vinyl chloride-acetate copolymer | 0 | nil | nil |
| vinyl chloride-acetate copolymer. | 4 PHR | 2800g. | 650g. |
| vinyl chloride-acetate copolymer + maleic acid modified. | 0 | 1400g. | 600g. |

EXAMPLE 5

Vinyl chloride-vinyl acetate copolymer (35 grams) was dissolved in a mixture of 60g of methyl ethyl ketone and 5g of methyl isobutyl ketone. One PHR of stabilizer (designated by Argus Chemical Corp. as Argus Mark LL) and 10 PHR of dioctyl phthalate plasticizer were added to the solution. Aliquot portions were taken and trimethylol propane tris (2-aziridinyl propionate was added to give 0, 2 ½, 5 and 10 PHR of the aziridine compound. The solutions were allowed to stand overnight to remove entrapped air and then were cast with a drawdown bar on finely sanded steel and on clean glass plates. The samples were dried, and the adhesion of the thoroughly dried films to the substrates was checked by 180° pullback of a ½ inch strip. The adhesion is shown in Table 3.

TABLE 3

| VINYL RESIN ADHESION | | |
|---|---|---|
| Amount of Aziridine Compound | Adhesion to Steel | Adhesion to Glass |
| 0 PHR | nil | nil |
| 2½ PHR | 2200–2300g. | 1200–1250g. |
| 5 PHR | 2400–3000g. | 1600g. |
| 10 PHR | 3000g. | 1700g. |

EXAMPLE 6

A solution of vinyl chloride-vinyl acetate copolymer was prepared in the same manner as in Example 5. Aliquot portions were taken and the polyfunctional aziridine compound was added to provide samples having 0 and 5 PHR of the aziridine in the copolymers.

A similar solution was then prepared using the identical quantitative formulation except that a maleic acid modified vinyl chloride-vinyl acetate copolymer was used. Such copolymers are noted for their adhesive properties and are widely used when excellent adhesion to various substrates is required.

The solutions were prepared, cast on clean glass sheets and dried. The 180° pullback adhesion of ½ inch strips were determined and is shown in Table 4.

TABLE 4

VINYL RESIN ADHESION

| Resin Composition | Amount of Aziridine | Force (grams) to Peel Resin From Glass |
|---|---|---|
| Vinyl chloride/ vinyl acetate | 0 PHR | nil |
| vinyl chloride/ vinyl acetate | 5 PHR | 1400–1500g. |
| acid modified vinyl chloride/vinyl acetate copolymer | 0 PHR | 600–650g. |

EXAMPLE 7

EXPERIMENTAL COMPARISON BETWEEN EMULSION AND SOLVENT-BASED VINYL RESINS

Aqueous emulsion of Vinyl Resin

An aqueous emulsion of dioctyl phthalate was prepared and added to an aqueous emulsion of a polyvinyl chloride homopolymer resin with an anionic emulsifier. The aqueous emulsion is commercially available from B. F. Goodrich Co. under the tradename Geon 151. 100 grams of the aqueous polyvinyl chloride emulsion (56 grams solids) were mixed with 30.1 grams of the aqueous dioctyl phthalate emulsion which contained 19.6 grams of the dioctyl phthalate. This represented 35 parts of dioctyl phthalate per hundred parts of resin.

Coating samples were made from the aqueous emulsion, one sample comprising a blank and the other samples comprising the emulsion with 2.3 parts by weight per hundred parts of resin of a polyfunctional aziridine as follows: tris (1-aziridinyl phosphine oxide; tris (1-aziridinyl) phosphine sulfide; trimethylol propane tris (2-aziridinyl propionate); and pentaerythritol tetra-3-(1-aziridinyl propionate). Each of the coating compositions was saturated on a nylon scrim and placed upon vapor degreased steel plates, squeegeed on the surface of the steel plate with the removal of excess coating material, dried at 45°C and cured for 5 minutes at 160°C.

Adhesion of the blank (containing no polyfunctional aziridine) to the steel was poor and the polyvinyl chloride peeled readily from the steel leaving some of the coating on the steel and some on the nylon scrim. The coatings containing the polyfunctional aziridines adhered tightly to the nylon but also required more force than the coating prepared from the blank to strip from the steel. However, the adhesion to the steel plate was at more only a fair adhesion.

The plasticized polyvinyl chloride emulsions (plasticized with the dioctyl phthalate) containing the polyfunctional aziridine compounds gelled rapidly and had a limited shelf life.

Organic Solvent-based Vinyl Resin

For purposes of comparison a similar experiment was run in the same manner as the above experiment utilizing a vinyl chloride-vinyl acetate copolymer of medium molecular weight and having 87 percent vinyl chloride and 13 percent vinyl acetate (available from Union Carbide Corp. as Vinylite VYHH). The solution of the copolymer was approximately 35 percent solids dissolved in ketone solvents. The coating composition comprised 100 grams of the vinyl copolymer, 10 grams of dioctyl phthalate and 1 gram of a liquid mercaptide stabilizing agent available from Argus Chemical Corpl as Argus Mark 292.

Coating samples were made, one sample as a blank and the other samples containing 3 weight per cent (based upon the weight of the vinyl copolymer) of the polyfunctional aziridines described above. Each sample was saturated on a nylon crim squeegeed on vapor degreased panels (steel plates) and the panels were dried overnight at 45°C.

Adhesion of the nylon scrim coated with the blank to the steel was nil, whereas the adhesion of the samples containing the polyfunctional aziridine compounds was excellent, and it was almost impossible to strip the coating compositions prepared with the polyfunctional aziridines from the metal plate.

A comparison of the above results obtained by coating the aqueous emulsion-based vinyl resins to the steel plate and the inert, liquid organic medium-based vinyl resin to the steel plate shows the unexpected superiority of the vinyl resin system based upon the inert, liquid organic medium of the present invention.

EXAMPLE 8

A plastisol coating composition was prepared using 100 grams of a commercially available polyvinyl chloride homopolymer designated by Union Carbide Corp. as Vinylite QYNV, 50 grams of dioctyl phthalate and 1.5 grams of liquid mercaptide vinyl stabilizer, (Argus M-292). Aliquot portions were removed and trimethylol propane tris-(2-aziridinyl propionate), trimethylol propane tris (2-aziridinyl butyrate), tris (1-aziridinyl) phosphine oxide, and pentaerythritol tris-3-(1-aziridinyl propionate) dissolved in dioxane were added to respective aliquot parts to provide 5 parts of each polyfunctional aziridine per one hundred parts of resin (by weight) in the plastisol. These were compared with a blank. Each of the prepared coating compositions were spread upon a steel surface and a plastic surface (Mylar). The adhesion of each of the coating compositions to the particular substrate are shown in Table 5 below where it can be seen that the coating compositions containing the polyfunctional aziridine compounds have adhesive properties superior to those in which the polyfunctional aziridine is absent. All the aziridine compounds produced comparable results. After the samples were coated upon the respective surfaces the samples were cured at about 182°–185°C.

TABLE 5

PLASTISOL COATING

| Amount of Aziridine | *Adhesive Properties | |
|---|---|---|
| | STEEL SURFACE | MYLAR SURFACE |
| 0 PHR (blank) | Poor | Fair |
| 5 PHR | Good | Excellent |

*Empirically compared on scale of poor, fair, good, excellent.

EXAMPLE 9

A commercially available polyvinyl chloride based organosol designated by Mannington Mills Company as Stabilized J469 Organosol was used to determine the effect of a coating composition prepared by adding a polyfunctional aziridine dissolved in dioxane to the organosol. Samples of the organosol were prepared for coating upon a Mylar film. One sample contained no polyfunctional aziridine, and to the other samples were added 0.2 ml. of tris(1-aziridinyl) phosphine oxide, tris (2-methyl-1-aziridinyl) phosphine oxide, pentaerythritol tetra-3-(1-aziridinyl propionate), and trimethylol propane tris (2-aziridinyl propionate) respectively. After coating, the samples were cured at about 185°C. for five minutes. In an empirical test described in Table 5 above the organosol samples containing the polyfunctional aziridines had excellent adhesive properties whereas the organosol coating composition containing no polyfunctional aziridine had poor adhesive properties.

EXAMPLE 10

One hundred grams of high molecular powdered polyvinyl chloride suitable for powder coating applications was treated with 7.9 grams of trimethylol propane tris(2-aziridinyl propionate) in 40 grams of dioctyl phthalate containing 1.5 grams stabilizer (Advastab T-290 available from Cincinnati Milacron Chemical, Inc.). The powdered polyvinyl chloride is commercially available from Stauffer Chemical Co. under the trade designation SCC-700. The powder after mixing remained free-flowing in a powder form essentially unchanged in consistency from the initial untreated powder. Both treated and untreated powder were applied to a steel surface and heated at about 200°C. for approximately 5 minutes.

The adhesive strength of the polyvinyl chloride resin coats deposited upon the metallic substrates were compared, and the vinyl resin containing the polyfunctional aziridine demonstrated excellent adhesion whereas the vinyl resin containing no polyfunctional aziridine demonstrated only fair (slight) adhesion. In the same manner similar compositions were prepared with tris (1-aziridinyl) phosphine oxide, tris (1-aziridinyl) phosphine sulfide and pentaerythritol tris-3-(1-aziridinyl propionate). In all cases excellent adhesion was obtained with the vinyl resin containing the polyfunctional aziridine whereas the control sample demonstrated only poor to slight adhesion.

In the above examples, unless otherwise shown quantities designated in parts are to be expressed in parts by weight.

The above examples are not meant to limit the scope of the invention or the applications to which this invention may be directed. It is to be understood that although the invention has been described with specific reference to particular embodiments thereof, it is not to be so limited, since changes and alterations therein may be made which are within the full intended scope of this invention as defined by the appended claims.

I claim:

1. A process for promoting the adhesion of a free-flowing powdered vinyl resin to a substrate comprising producing an anhydrous coating composition consisting essentially of said vinyl resin and at least about 0.5% by weight based upon the weight of the vinyl resin of a polyfunctional aziridine having at least two aziridinyl groups per molecule, said aziridine being dissolved in an organic liquid medium that is non-reactive with the aziridine; and applying said coating composition to the substrate, whereby the polyfunctional aziridine increases the adhesion of the vinyl resin to the substrate.

2. A process for promoting the adhesion of a vinyl resin in a non-aqueous medium or in a powdered or dry form to a substrate comprising producing an anhydrous coating composition consisting essentially of said vinyl resin and at least about 0.5 percent by weight based upon the weight of the vinyl resin of a polyfunctional aziridine having at least two aziridinyl groups per molecule, said aziridine being dissolved in an organic liquid vinyl resin plasticizer that is non-reactive with the aziridine; and applying said coating composition to the substrate, whereby the polyfunctional aziridine increases the adhesion of the vinyl resin to the substrate.

3. A process in accordance with claim 2 wherein the vinyl resin plasticizer is dioctyl phthalate.

4. A process for promoting the adhesion of a vinyl resin in a non-aqueous medium or in a powdered or dry form to a substrate comprising producing an anhydrous coating composition consisting essentially of said vinyl resin and at least about 0.5 percent by weight based upon the weight of the vinyl resin of a polyfunctional aziridine selected from the group consisting of trimethylol propane tris (2-aziridinyl propionate), trimethylol propane tris (2-aziridinyl butyrate), pentaerythritol tris-3-(1-aziridinyl propionate) and pentaerythritol tetra-3-(1-aiziridinyl propionate), said aziridine being dissolved in an organic liquid medium that is non-reactive with the aziridine; and applying said coating composition to the substrate, whereby the polyfunctional aziridine increases the adhesion of the vinyl resin to the substrate.

5. A process in accordance with claim 4 wherein said polyfunctional aziridine is trimethylol propane tris (2-aziridinyl propionate).

6. A process in accordance with claim 4 wherein said polyfunctional aziridine is trimethylol propane tris (2-aziridinyl butyrate).

7. A process in accordance with claim 4 wherein said polyfunctional aziridine is pentaerythritol tris-3-(1-aziridinyl propionate).

8. A process in accordance with claim 4 wherein said polyfunctional aziridine is pentaerythritol tetra-3-(1-aziridinyl propionate).

* * * * *